(12) United States Patent  
Vedantham et al.

(10) Patent No.: US 9,356,762 B2
(45) Date of Patent: *May 31, 2016

(54) ELECTRIC VEHICLE AND SERVICE EQUIPMENT ON A PILOT WIRE

(71) Applicant: Texas Instruments Incorporated, Dallas, TX (US)

(72) Inventors: Ramanuja Vedantham, Allen, TX (US); Gang Gary Xu, Allen, TX (US); Donald P. Shaver, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,789

(22) Filed: Apr. 21, 2015

(65) Prior Publication Data

US 2015/0229458 A1 Aug. 13, 2015

Related U.S. Application Data

(63) Continuation of application No. 13/650,125, filed on Oct. 11, 2012, now Pat. No. 9,014,247.

(60) Provisional application No. 61/554,545, filed on Nov. 2, 2011, provisional application No. 61/547,406, filed on Oct. 14, 2011.

(51) Int. Cl.
| | |
|---|---|
| *H03K 7/08* | (2006.01) |
| *H03K 9/08* | (2006.01) |
| *H04L 5/00* | (2006.01) |
| *H04B 1/38* | (2015.01) |
| *H04L 25/49* | (2006.01) |
| *H04L 12/40* | (2006.01) |
| *H04B 3/54* | (2006.01) |
| *H04L 12/413* | (2006.01) |
| *H04L 27/26* | (2006.01) |

(52) U.S. Cl.
CPC ............... *H04L 5/0062* (2013.01); *H04B 1/38* (2013.01); *H04B 3/544* (2013.01); *H04L 5/0046* (2013.01); *H04L 12/4013* (2013.01); *H04L 12/40189* (2013.01); *H04L 12/413* (2013.01); *H04L 25/4902* (2013.01); *H04L 27/2611* (2013.01); *H04L 5/0091* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| 4,528,611 A * | 7/1985 | Udren | H02H 3/081 361/64 |
|---|---|---|---|
| 2010/0138088 A1* | 6/2010 | Ichikawa | B60L 1/003 701/22 |
| 2012/0128081 A1* | 5/2012 | Hikihara | H04B 3/54 375/257 |

*Primary Examiner* — Chieh M Fan
*Assistant Examiner* — Wednel Cadeau
(74) *Attorney, Agent, or Firm* — Steven A. Shaw; Frank D. Cimino

(57) ABSTRACT

Electric Vehicle Service Equipment (EVSE) and Electric Vehicle (EV) are disclosed n. In an example embodiment, a modem is coupled to the pilot wire that couples the EVSE and the EV. The modem transmits both pulse width modulation (PWM) command signals and power line communication (PLC) signals to a remote device via the pilot wire. The modem interleaves the PWM and PLC signals on the pilot wire so that latency requirements for the PWM signals are maintained. The modem supports parallel protocol stacks in which PLC signals are processed in a first path and PWM signals are processed in a second path that bypasses the first path and provides the PWM signals directly to a MAC layer. The modem may create a modified frame for the PLC signals to maintain the latency requirements.

33 Claims, 3 Drawing Sheets

ELECTRIC VEHICLE AND SERVICE EQUIPMENT ON A PILOT WIRE

CROSS-REFERENCE TO RELATED APPLICATIONS

This application is a Continuation and claims priority to U.S. patent application Ser. No. 13/650,125, filed Oct. 11, 2012—now U.S. Pat. No. 9,014,247 granted on Apr. 21, 2015. Said application claims the benefit of the filing dates of U.S. Provisional Patent Application No. 61/547,406, which is titled "Efficient Communication Paradigm for Charger—Electric Vehicle Communication Using Narrowband PLC" and was filed Oct. 14, 2011, and of U.S. Provisional Patent Application No. 61/554,545, which is titled "Method for Pilot Wire Communication" and was filed Nov. 2, 2011. Said applications are hereby incorporated by reference herein in their entireties.

BACKGROUND

Electric Vehicles (EV)—i.e. vehicles propelled by one or more electric motors—are powered by large, rechargeable batteries. Electric vehicles are limited by available battery technology, which limits the range per charge for most of these vehicles. For widespread deployment and use of electric vehicles to be feasible, there must be widely available recharging stations, such as in homes and public locations.

Electric Vehicle Supply Equipment (EVSE) includes chargers and charging stations for electric vehicles. The EVSEs regulate the amount of power that an electric vehicle draws from the charging station. An electric vehicle is connected to a cable from the EVSE using a special connector, such as an SAE J1772-compliant connector, for recharging. A typical SAE J1772 charging cable incorporates five conductors: two for AC or DC power (AC/DC mains), one for proximity detection, one for the pilot control signal ("pilot wire"), and one for equipment ground. The control pilot carries a ±12V PWM signal to provide information to the EV such as charging level. When the electric vehicle is connected to the EVSE, the pilot wire is used to regulate the electricity available to, and/or drawn by, the electric vehicle. Pulse Width Modulation (PWM) control signals may be carried on the pilot wire between the EVSE and the EV. The PWM signal indicates to the electric vehicle whether it should recharge by drawing power from the 120 V AC line, or the 240 V AC line, for example.

The EVSE is also coupled to a power line network, such as an electrical distribution network for a home, and regulates the electricity drawn by the electric vehicle from the power line network. Power Line Communications (PLC) are used on some power line networks to transmit data and communication signals. Because the electric vehicle is coupled to the power line network via the EVSE cable, power line communications may be routed between the electric vehicle and modems on the power line network, such as modems or controllers for a utility company.

To avoid development of a new charging cable, the EV and the EVSE must communicate reliably without adding new wires to the J1772 cable. Two solutions have been considered for EV-EVSE communications: (1) communications over the AC/DC mains wires, and (2) communications using the control pilot/equipment ground.

The pilot wire provides a more benign communication environment than the AC/DC mains and offers more reliable communications and at higher bit rates. The useable bandwidth may be restricted on the AC/DC mains. For example, communications on the mains is limited to the CENELEC B, C and D band frequencies in some countries. The pilot wire is not subject those bandwidth restrictions; however, the pulse widths on the pilot wire are critical for EV-EVSE communications and must be maintained per the J1772 specification. Therefore, PLC on the pilot wire must not distort the PWM signal.

A key requirement for communication between the EVSE and the EV is to maintain a stringent round-trip latency requirement on the order of 25 milliseconds for certain DC messages or commands. However, this strict latency requirement is difficult to meet for other communications, such as EV to Utility company communications over the power grid.

Communications between the EV and the Utility may be Orthogonal Frequency-Division Multiplexing (OFDM) signals that comply with a PRIME (Powerline Related Intelligent Metering Evolution), G3, IEEE P1901.2 or other Power Line Communication (PLC) standard, for example. The communication signal may be Frequency Shift Keying (FSK) or Phase Shift Keying (PSK) signals depending on the transmission method. Power line communication systems based on narrowband OFDM (NB-OFDM) are being developed for smart grid technologies. European utilities, such as Iberdrola (PRIME) and ERDF (G3), are pioneering the deployment of NB-OFDM PLC systems for advanced metering. The SAE and the ISO have shortlisted NB-OFDM systems that are based on PRIME and G3 for car charger applications. However, when deployed in an electronic vehicle charging scenario, these OFDM signals must not interfere with the PWM control signals exchanged between the EV and EVSE.

SUMMARY

A pilot wire system couples Electric Vehicle Service Equipment (EVSE) and an Electric Vehicle (EV). The pilot wire carries pulse width modulation (PWM) signals between the EVSE and EV. First and second modems are coupled to the pilot wire and exchange OFDM communication signals via the pilot wire.

In one embodiment, a modem is coupled to a pilot wire in an electric vehicle charging system. The pilot wire couples the electric vehicle service equipment and an electric vehicle. The modem transmits both pulse width modulation (PWM) command signals and power line communication (PLC) signals to a remote device via the pilot wire. The modem interleaves the PWM and PLC signals on the pilot wire so that latency requirements for the PWM signals are maintained.

The modem may be located in electric vehicle service equipment of the electric vehicle charging system. In which case, the remote device is a modem in an electric vehicle. Alternatively, the modem may be located in an electric vehicle, and the remote device is a modem coupled to electric vehicle service equipment, and wherein the latency requirements comprise a twenty-five milliseconds maximum round-trip transmission time for the PWM command signals.

The modem may support parallel protocol stacks in which PLC signals are processed in a first path and PWM signals are processed in a second path that bypasses the first path and provides the PWM signals directly to a MAC layer. The first path includes a SEP 2.0 application convergence protocol stack, a IPv6 convergence layer, and a 6LowPAN convergence layer. The PLC signals may be processed in the MAC layer using Carrier Sense Multiple Access/Collision Avoidance (CSMA/CA). In one embodiment, the PLC signals are Orthogonal Frequency-Division Multiplexing (OFDM) signals, and the OFDM signals comply with a PRIME (Powerline Related Intelligent Metering Evolution) or G3 standard.

The modem interleaves the PWM and PLC signals by identifying when PWM messages are transmitted, and then transmitting a PLC message between a PWM message and a PWM response. The PWM messages may be assigned a highest priority and then transmitted in a next available contention free slot, and the PLC messages are assigned an intermediate or normal traffic priority with a maximum back-off slot duration.

The modem may create a modified frame comprising a preamble, a header, and a payload. The preamble comprises a positive phase chirp sequence and a negative phase chirp sequence. The header comprises four frame control header symbols. The payload comprises a maximum of seven symbols. The frame control header symbols may comprise a maximum of twelve bits, wherein two bits represent a selected modulation scheme, three bits represent a packet length, and five bits are used for redundancy or error detection.

The modem may communicate with the remote device in a combined CENELEC A and B band using fifty-five tones in an Orthogonal Frequency-Division Multiplexing (OFDM) signal or in a combined CENELEC A, B and C band using sixty-two tones in an Orthogonal Frequency-Division Multiplexing (OFDM) signal.

BRIEF DESCRIPTION OF THE DRAWINGS

Figure 1:
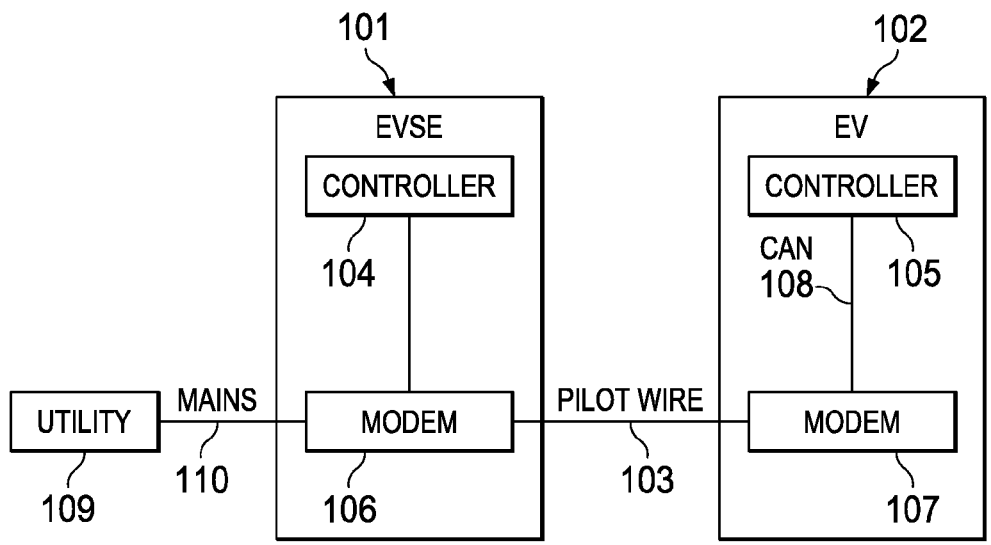

Having thus described the invention in general terms, reference will now be made to the accompanying drawings, wherein:

FIG. 1 illustrates a pilot wire communication system according to one embodiment.

Figure 2:
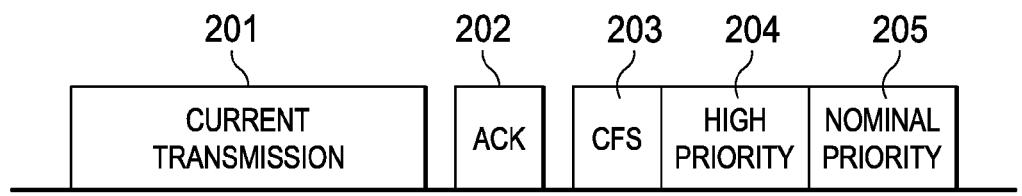

FIG. 2 illustrates how message priorities may be managed in modems on a pilot wire communication system.

Figure 3:
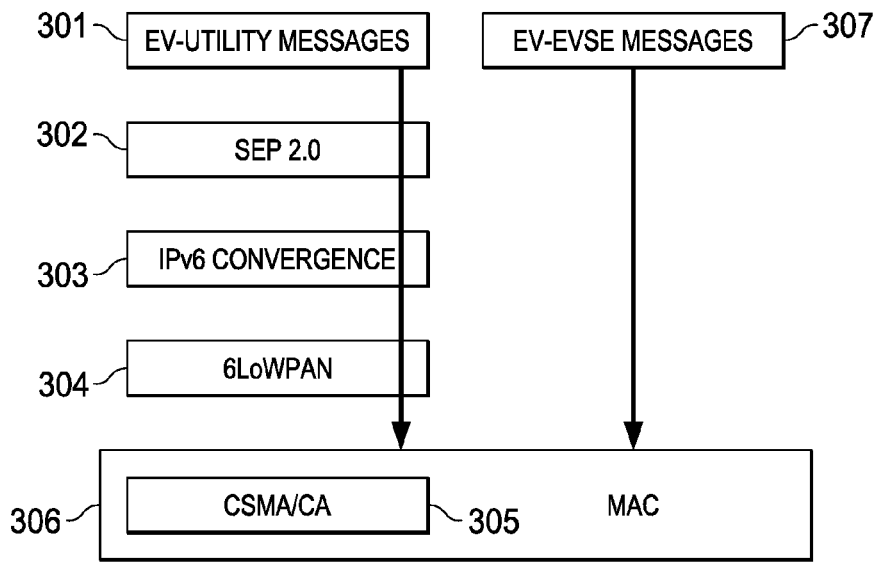

FIG. 3 illustrates a modified protocol stack that is used by modems to support both EV-EVSE and EV-Utility communications.

Figure 4:
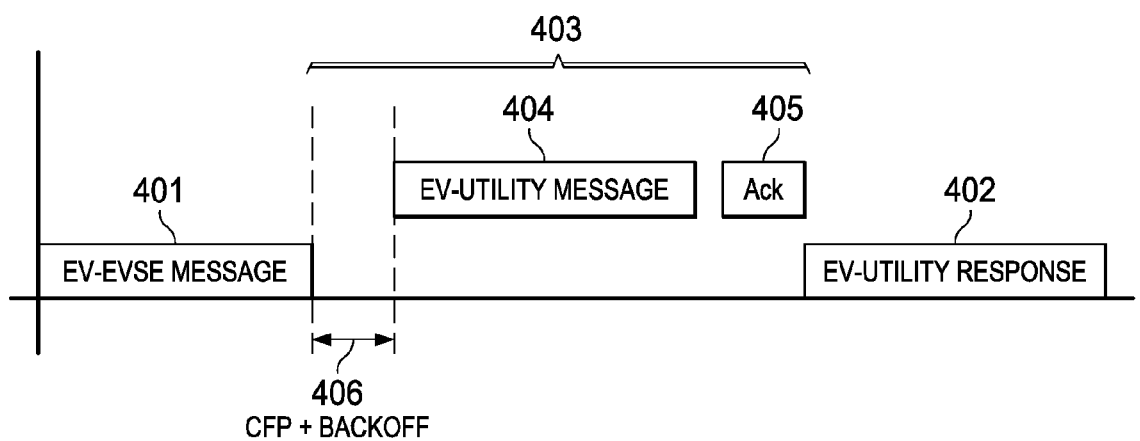

FIG. 4 illustrates an example of interleaving of the EV-EVSE messages/commands and EV-Utility messages so that latency requirements are met.

Figure 5:
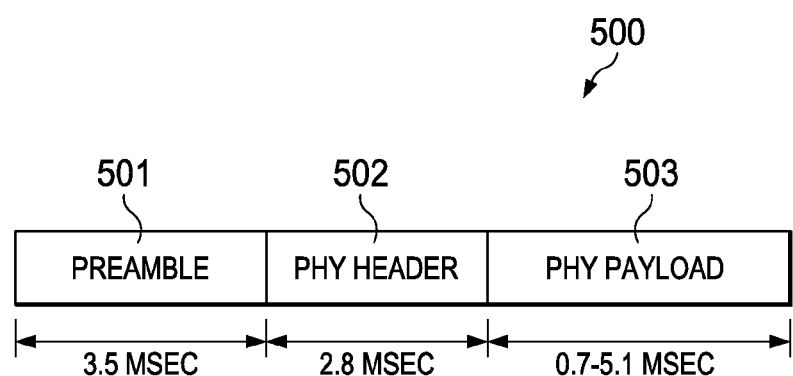

FIG. 5 illustrates a modified frame structure that may be used with EV communications systems.

Figure 6:
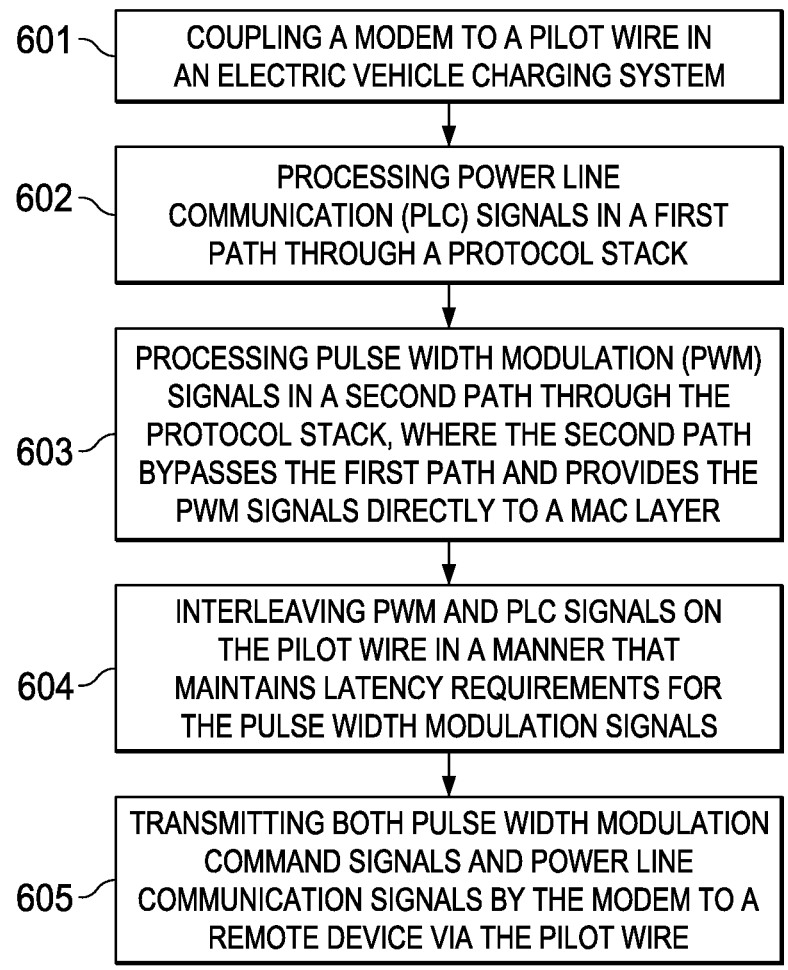

FIG. 6 is a flowchart illustrating a method for transmitting signals on a pilot wire according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a pilot-wire communication system according to one embodiment. Electric Vehicle Supply Equipment (EVSE) 101 is coupled to an Electric Vehicle (EV) 102 via a pilot wire 103. A controller 104 in EVSE 101 communicates with a controller 105 in EV 102 using PWM signals on pilot wire 103. Modem 106 provides an interface between controller 104 in EVSE 101 and the pilot wire 103. Modem 107 provides a pilot wire interface in EV 102 and may be coupled to controller 105 over a Controller Area Network (CAN) bus 108, for example.

EV 101 may also communicate with a utility company 109 or other node/controller on the power grid by exchanging PLC data messages via mains 110. Modems 106 and 107 integrate the EV-EVSE control signals (PWM) and the EV-Utility data signals (e.g. narrowband PLC) in a manner that maintains the EV-EVSE reliability and latency requirements. The mechanism proposed herein provides reliable and opportunistic communication for EV-Utility messages, which do not have stringent latency requirements, while maintaining fast and efficient EV-EVSE communications that adhere to the round-trip latency requirements for the charging system commands.

In one embodiment, the EV-EVSE messages/commands and the EV-Utility messages are assigned different priorities and connection types. For example, the EV-Utility messages may be assigned an intermediate traffic priority with a maximum back-off slot duration of up to 7 slots, which corresponds to 14 symbols as defined in the G3 and IEEE P1901.2 specification. On the other hand, the EV-EVSE messages/commands are assigned the highest priority and are transmitted in a contention free slot (CFS) immediately following a current or previous transmission.

FIG. 2 illustrates how message priorities may be managed in modems 106, 107. When a current transmission 201 ends, an acknowledgement (Ack) frame 202 is returned. A contention state follows the acknowledgement frame 202 and begins with a contention free slot (CFS) 203. In one embodiment, EV-EVSE commands/messages are transmitted in this CFS 203. After CFS 203, other messages, such as EV-Utility messages, may be transmitted in high priority slot 204 or normal/low priority slots 205.

FIG. 3 illustrates a modified protocol stack that is used by modems 106 and 107 to support both EV-EVSE and EV-Utility communications. The two classes of messages follow different paths through the protocol stack. The EV-Utility messages 301 go through a SEP 2.0 application convergence protocol stack 302, a IPv6 convergence layer 303, and a 6LowPAN convergence layer 304 before being handled at Carrier Sense Multiple Access/Collision Avoidance (CSMA/CA) 305 in MAC layer 306.

On the other hand, the EV-EVSE messages/commands 307 are just one-hop from, and directly interact with, the MAC layer 306. This allows the EV-EVSE messages/commands 307 to avoid the overhead incurred by EV-Utility messages at convergence layers 302-304 and, therefore, comply with stringent EV-EVSE latency requirements.

In one embodiment, the EV-Utility messages are transmitted as unicast messages with the MAC level acknowledgements and retransmissions (MAC ARQ) set to allow for reliable communication. However, this increases the latency incurred in the transmission of these EV-EVSE messages. On the contrary, the EV-Utility commands/messages may be sent in broadcast fashion with no MAC level acknowledgements/retransmissions (no MAC ARQ). This configuration helps the EV-EVSE message/commands to meet the latency requirements imposed on these messages.

In another embodiment, different modulation schemes are used by the different message types. The EV-Utility messages are sent with the highest modulation scheme, such as 8-PSK and above, which allows the EV-Utility messages to be accommodated in the intervals between EV-EVSE messages and corresponding EV-EVSE responses. In the event that an EV-Utility message cannot be sent with the highest modulation scheme, the message may be segmented at the MAC layer and transmitted as smaller pieces using the best possible modulation scheme to reduce the channel occupancy of any single frame. EV-EVSE messages/commands are sent with a more robust modulation scheme. The EV-EVSE messages/commands typically have a small frame size, and they are transmitted with no MAC level retransmissions.

FIG. 4 illustrates an example of interleaving of the EV-EVSE messages/commands and EV-Utility messages so that latency requirements are met. For example, EV-EVSE message/command 401 is transmitted by the EV to the EVSE. After the EVSE receives message 401, it responds with EV-EVSE response 402. The EV also has an EV-Utility message 402 pending. The EV takes advantage of the time interval 403 between EV-EVSE command 401 and response 402 to transmit an EV-Utility message 404. Acknowledgement message 405 may also be transmitted during interval 403. The EV limits the frame duration of messages 404/405 so that the round-trip latency can be adhered. The EVSE needs to wait for a certain time to send the response 402 back so that the EV-Utility message 404 can get through.

The EV-EVSE messages/commands 401 are transmitted in the CFP with the highest priority. The EV-Utility messages 404 are assigned lower or intermediate priority with back-off slots of up to 7 slots (14 symbols). In one embodiment, there may be some loose level of synchronization between EV-EVSE message generation and EV-Utility message transmission to ensure that the round-trip latency is met. For example, the EV-EVSE messages may be generated only during the contention free period (CFP) transmission slot associated with the end of a frame so that there is no delay incurred in the transmission of the initial EV-EVSE message. The EV-Utility message/command 404 may be transmitted after interval 406, which corresponds to a CFP plus a back-off period.

Additional modifications to existing PLC schemes may be used to improve the round-trip latency for EV communication systems, which is desired to be less than 25 milliseconds. For example, the frequency bands used with the G3 standard may be varied.

As noted above, different PLC standards have been established by various standardizing bodies have set forth frequency restrictions for PLC communications. For example, the European Committee for Electromechanical Standardization (CENELEC) currently allows the implementation of such communications in the 3 kHz-148.5 kHz frequency range only, and this prescribed spectrum is further divided into smaller bands (CENELEC bands A-D) that can be allocated for particular applications.

Specifically, the CENELEC's "A" band includes frequencies in the 3-95 kHz range, and it is dedicated to electricity suppliers (i.e., "access" applications such as metering, etc.). CENELEC's "B" band includes frequencies in the 95-125 kHz range for consumer applications that may involve the user of higher data rates. The "C" band includes frequencies in the 125-140 kHz range, also for consumer use, but requires that a specific protocol be followed. The "D" band includes frequencies in the 140-148.5 kHz range for consumer applications that involve the use lower data rates. (At the present time, neither the B-band nor the D-band communications mandates the use of a special protocol.) Examples of PLC applications include, but are not limited to, access communications, alternating current (AC) charging, direct current (DC) charging, in-premises connectivity (e.g., home networking), etc.

Although various examples described herein are discussed in the context of CENELEC regulations, it should be understood that the disclosed techniques may be similarly applicable to other environments and/or geographic regions. In the U.S., for example, the Federal Communications Commission (FCC) presently requires that PLC communications occupy the spectrum between ~9-534 kHz, without subband restrictions, unlike its European counterpart. Nonetheless, the inventors hereof recognize that the use of sub-bands in the U.S. may evolve in such a way that at least a portion of the prescribed spectrum may also be sub-divided for different types of applications.

In one embodiment the EV communications scheme uses the CENELEC A and B bands (35.9-121.875 KHz) or A, B and C bands (35.9-132.78). The tone spacing is the same as G3/P1901.2 Cenelec band definition, which is 1.5625 kHz. The number of tones used is 55 for AB band and 62 for ABC band.

FIG. 5 illustrates a modified frame structure 500 that may be used with EV communications systems. Frame structure 500 is shortened to allow for faster transmission. Preamble 501 comprises, for example, four positive phase chirp sequences (i.e., 4×SYNCP symbols) and one and a half negative phase chirp sequences (i.e., 1.5×SYNCM symbols). PHY Header 502 comprises four frame control header (FCH) symbols (i.e., 4×FCH symbols). PHY Payload 503 has a variable length of 0-7 PHY payload symbols, which provides a maximum packet size of 11.4 milliseconds with above-described preamble and header.

In one embodiment, the FCH parameters in PHY Header 502 are selected so that there are a total 12 FCH bits. The modulation scheme is indicated using two of these 12 bits. Table 1 illustrates an example mapping of the modulation bits to a modulation type. The packet length is defined in 3 bits (e.g., b2/b3/b4=packet length 0-7 OFDM symbols). A cyclic redundancy check (CRC-5) uses 5 bits, and the remaining 2 bits are reserved.

TABLE 1

| MODULATION BITS (b0/b1) | Modulation Type |
| --- | --- |
| 00 | ROBO |
| 01 | DBPSK |
| 10 | DQPSK |
| 11 | D8PSK |

The PHY Payload parameters 503 are selected based upon the identified modulation scheme (bits b0/b1 in Table 1) and is limited to seven OFDM symbols per packet. The PHY Payload is encoded using, for example, a rate 1/2 convolutional encoder, such as a T=4 Reed Solomon encoder with 8 parity bytes. The PHY Payload 503 may be modulated using any of the modulation schemes listed in Table 1 (e.g., ROBO/DBPSK/DQPSK/D8PSK) or any other appropriate modulation method. The payload size is limited to 7 OFDM symbols to reduce the packet duration. The coded bits may be interleaved to improve performance under PWM and interference.

Table 2 illustrates example data rates and latencies for an EV communication system using the above-identified frame structure in the CENELEC AB bands.

TABLE 2

| | NO. OF PHY BYTES | NO. OF PAYLOAD BYTES | NO. OF OFDM SYMBOLS | PACKET DURATION (msec.) | THROUGHPUT (kbps) |
|---|---|---|---|---|---|
| D8PSK | 71 | 93 | 7 | 11.2 | 45.1 |
| D8PSK | 22 | 14 | 3 | 8.39 | 13.4 |
| DQPSK | 22 | 14 | 4 | 9.08 | 12.3 |
| DBPSK | 22 | 14 | 7 | 11.2 | 10.0 |

The pilot wire transmitter in one embodiment operates by increasing the coverage band to Cenelec A+B or A+B+C and increasing the number of tones to 55/62. The preamble and FCH sizes are reduced, and the frame also has a reduced payload size. Using these parameters, the packets can be optimized to meet stringent round-trip delay requirements.

FIG. 6 is a flowchart illustrating a method for transmitting signals on a pilot wire according to one embodiment. In step 601, a modem is coupled to a pilot wire in an electric vehicle charging system. The pilot wire couples the electric vehicle service equipment and an electric vehicle. In step 602, power line communication (PLC) signals are processed in a first path through a protocol stack. In step 603, pulse width modulation (PWM) command signals are processed in a second path through the protocol stack. The second path bypasses the first path and provides the PWM signals directly to a MAC layer.

In step 604, the PWM command signals and the PLC signals are interleaved on the pilot wire by a modem in a manner that maintains latency requirements for the PWM signals. The modem may be located in electric vehicle service equipment of the electric vehicle charging system or in an electric vehicle that is coupled to the charging system via the pilot wire. In one embodiment, the latency requirements comprise a twenty-five milliseconds maximum round-trip transmission time for the PWM command signals. In other embodiments, the latency requirements may be set by a protocol standard.

The PWM and PLC signals may be interleaved by identifying when PWM messages are transmitted, and then transmitting a PLC message between a PWM message and a PWM response.

In step 605, both the PWM and PLC signals are transmitted by the modem to a remote device via the pilot wire. In one embodiment, the PWM messages are assigned a highest priority, and the PLC messages are assigned an intermediate or normal traffic priority with a maximum back-off slot duration. The PWM messages are transmitted in a next available contention free slot.

The modem may create frame for transmitting the PLC signals. The frame may comprise a preamble, a header, and a payload. In an example embodiment, the preamble may include a positive phase chirp sequence and a negative phase chirp sequence, the header may include four frame control header symbols, and the payload may include a maximum of seven symbols. The frame control header symbols may comprise, for example, a maximum of twelve bits in which two bits represent a selected modulation scheme, three bits represent a packet length, and five bits are used for redundancy or error detection. It will be understood that other frame control header symbol designs may also be used.

The modem may communicate with the remote device in a combined CENELEC A and B band using fifty-five tones in an Orthogonal Frequency-Division Multiplexing (OFDM) signal or in a combined CENELEC A, B and C band using sixty-two tones in an Orthogonal Frequency-Division Multiplexing (OFDM) signal.

It will be understood that steps 601-605 of the process illustrated in FIG. 6 may be executed simultaneously and/or sequentially. It will be further understood that each step may be performed in any order and may be performed once or repetitiously.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. An electric vehicle service equipment (EVSE), comprising:
   a pilot wire to couple the EVSE and an electric vehicle (EV);
   a controller configured to communicate with the EV using PWM signals on the pilot wire; and
   a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem supports a plurality of parallel protocol stacks in which PLC signals are processed in a first path and PWM signals are processed in a second path that bypasses the first path and provides the PWM signals directly to a MAC layer.

2. The electric vehicle service equipment of claim 1, wherein the modem is located in an electric vehicle charging system, and the remote device is a modem in an electric vehicle, and wherein the latency requirements comprise a twenty-five milliseconds maximum round-trip transmission time for the PWM command signals.

3. The electric vehicle service equipment of claim 1, wherein the modem is coupled to controller over a Controller Area Network (CAN) bus.

4. The electric vehicle service equipment of claim 1, wherein the first path includes a SEP 2.0 application convergence protocol stack, a IPv6 convergence layer, and a 6LowPAN convergence layer.

5. The electric vehicle service equipment of claim 1, wherein the PLC signals are processed in the MAC layer using Carrier Sense Multiple Access/Collision Avoidance (CSMA/CA).

6. The electric vehicle service equipment of claim 1, wherein the PLC signals are Orthogonal Frequency-Division Multiplexing (OFDM) signals.

7. The electric vehicle service equipment of claim 1, wherein the modem interleaves the PWM and PLC signals by identifying when PWM messages are transmitted, and then transmitting a PLC message between a PWM message and a PWM response.

8. The electric vehicle service equipment of claim 1, wherein PWM messages are assigned a highest priority and are transmitted in a next available contention free slot, and wherein PLC messages are assigned an intermediate or normal traffic priority with a maximum back-off slot duration.

9. The electric vehicle service equipment of claim 6, wherein the OFDM signals comply with a PRIME (Powerline Related Intelligent Metering Evolution) or G3 standard.

10. An electric vehicle service equipment (EVSE), comprising:
   a pilot wire to couple the EVSE and an electric vehicle (EV);
   a controller configured to communicate with the EV using PWM signals on the pilot wire;
   a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem operates to create a frame comprising:
   preamble, a header, and a payload;
   the preamble comprising a positive phase chirp sequence and a negative phase chirp sequence;
   the header comprising four frame control header symbols; and
   the payload comprising a maximum of seven symbols.

11. The electric vehicle service equipment of claim 10, wherein the frame control header symbols comprise a maximum of twelve bits, wherein:
   two bits represent a selected modulation scheme;
   three bits represent a packet length; and
   five bits are used for redundancy or error detection.

12. The electric vehicle service equipment of claim 10, wherein the modem is located in an electric vehicle charging system, and the remote device is a modem in an electric vehicle, and wherein the latency requirements comprise a twenty-five milliseconds maximum round-trip transmission time for the PWM command signals.

13. The electric vehicle service equipment of claim 10, wherein the modem is coupled to controller over a Controller Area Network (CAN) bus.

14. An electric vehicle service equipment (EVSE), comprising:
   a pilot wire to couple the EVSE and an electric vehicle (EV);
   a controller configured to communicate with the EV using PWM signals on the pilot wire; and
   a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem operates to communicate with the remote device in a combined CENELEC A and B band using fifty-five tones in an Orthogonal Frequency-Division Multiplexing (OFDM) signal.

15. An electric vehicle service equipment (EVSE), comprising:
   a pilot wire to couple the EVSE and an electric vehicle (EV);
   a controller configured to communicate with the EV using PWM signals on the pilot wire; and
   a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem operates to communicate with the remote device in a combined CENELEC A, B and C band using sixty-two tones in an Orthogonal Frequency-Division Multiplexing (OFDM) signal.

16. An electric vehicle (EV), comprising:
   a pilot wire to couple the EV and an electric vehicle service equipment (EVSE);
   a controller configured to communicate with the EVSE or an utility using PWM signals on the pilot wire; and
   a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem supports a plurality of parallel protocol stacks in which PLC signals are processed in a first path and PWM signals are processed in a second path that bypasses the first path and provides the PWM signals directly to a MAC layer.

17. The electric vehicle of claim 16, wherein the first path includes a SEP 2.0 application convergence protocol stack, a IPv6 convergence layer, and a 6LowPAN convergence layer.

18. The electric vehicle of claim 16, wherein the PLC signals are processed in the MAC layer using Carrier Sense Multiple Access/Collision Avoidance (CSMA/CA).

19. The electric vehicle of claim 16, wherein the PLC signals are Orthogonal Frequency-Division Multiplexing (OFDM) signals.

20. The electric vehicle of claim 16, wherein the modem interleaves the PWM and PLC signals by identifying when PWM messages are transmitted, and then transmitting a PLC message between a PWM message and a PWM response.

21. The electric vehicle of claim 16, wherein PWM messages are assigned a highest priority and are transmitted in a next available contention free slot, and wherein PLC messages are assigned an intermediate or normal traffic priority with a maximum back-off slot duration.

22. The electric vehicle service equipment of claim 17, wherein the EV to utility commands/messages are be sent in a broadcast fashion with no MAC level acknowledgements/retransmissions (no MAC ARQ).

23. The electric vehicle of claim 17, wherein the EV to utility messages are assigned lower or intermediate priority.

24. The electric vehicle of claim 17, wherein the EV to utility messages are assigned lower or intermediate priority with back-off slots of up to 7 slots (14 symbols).

25. The electric vehicle of claim 17, wherein the EV to EVSE messages are generated only during the contention free period (CFP) transmission slot associated with the end of a frame so that there is no delay incurred in the transmission of the initial EV-EVSE message.

26. The electric vehicle of claim 25, wherein the EV to utility message/command are to be transmitted an interval, which corresponds to a CFP plus a back-off period.

27. The electric vehicle of claim 18, wherein the remote device is a modem coupled to EVSE, and wherein the latency requirements comprise a twenty-five milliseconds maximum round-trip transmission time for the PWM command signals.

28. The electric vehicle of claim 18, wherein the modem is coupled to controller over a Controller Area Network (CAN) bus.

29. The electric vehicle of claim 19, wherein the OFDM signals comply with a PRIME (Powerline Related Intelligent Metering Evolution) or G3 standard.

30. An electric vehicle (EV), comprising:
- a pilot wire to couple the EV and an electric vehicle service equipment (EVSE);
- a controller configured to communicate with the EVSE or an utility using PWM signals on the pilot wire; and
- a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem operates to create a frame comprising:
  - preamble, a header, and a payload;
    - the preamble comprising a positive phase chirp sequence and a negative phase chirp sequence;
    - the header comprising four frame control header symbols; and
    - the payload comprising a maximum of seven symbols.

31. The electric vehicle service equipment of claim 30, wherein the frame control header symbols comprise a maximum of twelve bits, wherein:
- two bits represent a selected modulation scheme;
- three bits represent a packet length; and
- five bits are used for redundancy or error detection.

32. An electric vehicle (EV), comprising:
- a pilot wire to couple the EV and an electric vehicle service equipment (EVSE);
- a controller configured to communicate with the EVSE or an utility using PWM signals on the pilot wire; and
- a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem operates to communicate with the remote device in a combined CENELEC A and B band using fifty-five tones in an Orthogonal Frequency-Division Multiplexing (OFDM) signal.

33. An electric vehicle (EV), comprising:
- a pilot wire to couple the EV and an electric vehicle service equipment (EVSE);
- a controller configured to communicate with the EVSE or an utility using PWM signals on the pilot wire; and
- a modem coupled to the pilot wire, the modem providing an interface between controller and the pilot wire, the modem operating to transmit both pulse width modulation (PWM) command signals and power line communication (PLC) signals to a remote device via said pilot wire, the modem interleaving the PWM and PLC signals on the pilot wire so that latency requirements for the PWM signals are maintained, wherein the modem operates to communicate with the remote device in a combined CENELEC A, B and C band using sixty-two tones in an Orthogonal Frequency-Division Multiplexing (OFDM) signal.

* * * * *